(12) United States Patent
Naskali

(10) Patent No.: US 6,346,346 B1
(45) Date of Patent: Feb. 12, 2002

(54) FLEXIBLE BATTERY STRUCTURE

(75) Inventor: Matti Naskali, Yliskulma (FI)

(73) Assignee: Nokia Mobile Phones Ltd., Espoo (FI)

( * ) Notice: Subject to any disclaimer, the term of this patent is extended or adjusted under 35 U.S.C. 154(b) by 0 days.

(21) Appl. No.: 09/754,999

(22) Filed: Jan. 5, 2001

(51) Int. Cl.⁷ .............................................. H01M 10/00
(52) U.S. Cl. ...................... 429/127; 429/162; 429/163; 429/185
(58) Field of Search ................. 429/127, 162, 429/163, 185

(56) References Cited

U.S. PATENT DOCUMENTS 5,558,957 A * 9/1996 Datta et al. ................. 429/127

* cited by examiner

*Primary Examiner*—Carol Chaney
*Assistant Examiner*—Dah-Wei D. Yuan
(74) *Attorney, Agent, or Firm*—Ware, Fressola, Van Der Sluys & Adolphson LLP

(57) ABSTRACT

A flexible battery structure comprises a stack of a layer of cathode active material and anode active material separated by a layer of electrolyte and held between a cathode flexible substrate and an anode flexible substrate, wherein the cathode and anode substrates have a surface area larger than the surface area of the stacked layers to form and define overlapping end portions which are hermetically sealed with a water-resistant composite material. The outer surface of the cathode and outer surface of the anode form the positive polarity and negative polarity connection leads of the battery structure. The anode and cathode substrates are flexible to accommodate applications in which the battery is subjected to bending.

21 Claims, 2 Drawing Sheets

FLEXIBLE BATTERY STRUCTURE

TECHNICAL FIELD

The present invention relates generally to battery structures and deals more particularly with a flexible battery structure.

BACKGROUND OF THE INVENTION

The advent of portable electronic devices such as laptop computers, mobile communication devices and personal digital assistants, for example, have created a demand for lightweight, high capacity batteries. Typical battery structures are somewhat rigid and typically are encased in a metallic can or other such rigid material to protect the battery and/or apply pressure to the battery components to create the necessary chemical reaction to produce electron flow. The use of such materials has limited the practical reduction in battery size and application of such batteries. Additionally, such battery materials could not accommodate applications wherein the battery structure encountered frequent flexing and bending such as in clothing apparel applications or wrist-worn products.

It was thought that lithium polymer batteries, which use a foil package made of a lamination of an aluminum layer between two plastic layers, would provide the desired flexibility for such applications. In reality, the aluminum is not able to withstand many bendings and thus does not provide the desired flexibility and reliability. In addition, the plastic lamination is susceptible to water impregnation, which reacts with the lithium to cause the battery to fail in a relatively short time.

A further disadvantage of such polymer batteries is the requirement that the electrode tabs must extend from within the plastic packaging to permit contact with an external electrical circuit with which the battery is used. It is difficult to completely seal the space through which the electrode tabs extend, which leads to an additional possible entry point for water impregnation.

Therefore, it is an object of the present invention to provide a flexible battery structure that can withstand repeated bending and flexing.

It is a further object of the present invention to provide a flexible battery structure that has a thinner profile thickness than equivalent conventional power density battery structures.

SUMMARY OF THE INVENTION

The present invention substantially obviates, if not entirely eliminates, the disadvantages of utilizing lithium polymer and other such batteries having foil packages made of a lamination of aluminum and plastic layers by providing a polymer battery wherein the outer packaging is eliminated entirely to reduce the thickness of the battery and allow flexing and bending of the battery structure.

In one aspect of the present invention, a flexible battery structure comprises a first flexible substrate having an inner surface face and an outer surface face defining a cathode; a layer of cathode active material adjacent to the inner surface face of the cathode substrate; a layer of electrolyte adjacent to the layer of cathode active material; a layer of anode active material adjacent to the electrolyte layer; a second flexible substrate having an inner surface and an outer surface face defining an anode wherein the anode inner surface is adjacent to the anode active material layer; and means for sealing the stack of layers formed between the first and second substrates.

Preferably, the cathode substrate and anode substrate have surface face areas larger than the stacked layers to define a marginal peripheral seam to sandwich the stacked layers.

Preferably, the marginal peripheral seam further comprises overlapping portions of each of the cathode substrate and anode substrate with respect to one another in a spaced relationship to prevent an electrical short circuit between said cathode substrate and said anode substrate.

Preferably, the marginal peripheral seam is hermetically sealed.

Preferably, the hermetic seal is comprised of a water-resistant composite material inserted between the overlapping portions of the cathode and anode substrates defining the marginal peripheral seam.

Preferably, the cathode and anode substrates are made of a metal foil wherein the cathode substrate is copper and the anode substrate is aluminum.

Preferably, the cathode outer surface face and the anode outer surface face define the exterior surfaces of the battery structure.

Preferably, the cathode outer surface face comprises the positive polarity connection lead and the anode outer surface face comprises the negative polarity connection lead.

Preferably, the layer of electrolyte comprises means for separating the cathode substrate and the anode substrate.

In a further aspect of the invention, one or more glass balls are inserted between the overlapping portions of the cathode and anode substrates defining the marginal peripheral seam to hermetically seal the seam between the cathode and anode substrates. Preferably, a non-electrically conductive, water-resistant composite material is inserted between the overlapping portions of the cathode and anode substrates defining the marginal peripheral seam.

Other features and advantages of the present invention will become more apparent from an understanding of the following detailed description of presently preferred embodiments of the invention when considered in conjunction with the accompanying drawings.

DETAILED DESCRIPTION OF PREFERRED EMBODIMENTS

Figure 1:
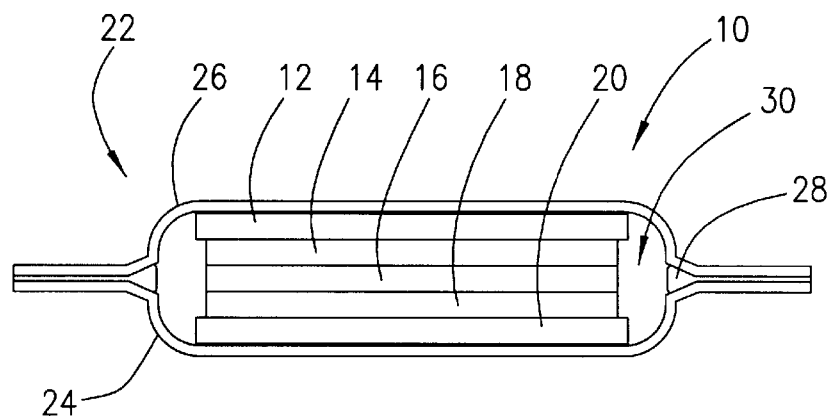
FIG. 1 is a schematic cross-section of a representative polymer battery.

Turning to FIG. 1, a schematic cross-section of a representative polymer battery is illustrated therein and is generally designated 10. The polymer battery 10 includes a typical construction comprising typical battery components, including a cathode 12, cathode active material 14, an electrolyte separator 16, anode active material 18, and an anode electrode 20. The battery components are stacked using conventional production methods and the different battery component layers are held together by means of a foil package, generally designated 22, comprising two lamination sheets 24, 26 in clam-shell-like arrangement to hold the battery component layers. Each lamination sheet 24, 26 is comprised of aluminum foil sandwiched by two plastic layers. The lamination sheets 24, 26 are held together by glue 28 or other adhesive means. A disadvantage of this construction is that the aluminum foil within the lamination 24, 26 does not withstand constant bending or flexing and eventually breaks, which allows moisture in the form of water to enter into the interior cavity 30, and which moisture reacts with the cathode or anode active material leading to battery failure. A further disadvantage of this construction is that conventional glues and adhesives generally absorb moisture and allow water to enter into the interior cavity 30.

Figure 2:
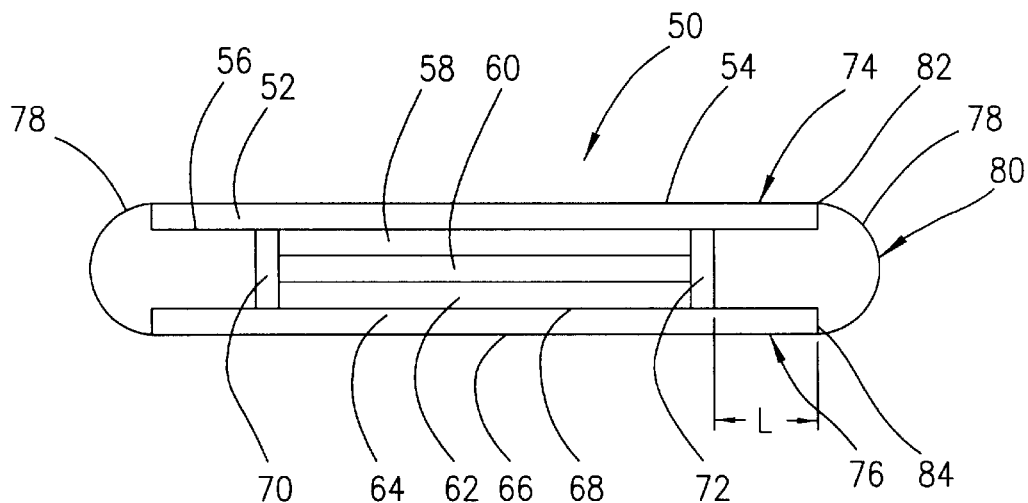
FIG. 2 is a schematic cross-section of a flexible battery embodying the present invention.

Turning now to FIG. 2 and considering the present invention in further detail, a schematic cross-section of a flexible battery embodying the present invention is illustrated therein and generally designated 50. The flexible battery 50 is comprised of a stack of layers starting with a first flexible substrate defining the cathode 52 having an outer surface 54 and inner surface 56. A layer of cathode active material 58 is adjacent to the inner surface 56 of the cathode 52. A layer of electrolyte 60 is adjacent to the cathode active material layer 58 to separate the cathode active material from the anode active material layer 62. A second flexible substrate defining an anode 64 has an outer surface 66 and an inner surface 68 adjacent to the anode active material layer 62. The cathode active material layer 58, electrolyte 60 and anode active material layer 62 are contained on their respective edge ends by a retaining wall 70, 72. The retaining walls 70, 72 are dimensioned to fit between the inner surface 56 of the cathode and the inner surface 68 of the anode 64 to contain the layers 58, 60, 62. The cathode active material layer 58 may be a cobalt oxide, manganese oxide, nickel oxide or other material now known or future-developed and familiar to those skilled in the battery art. The anode active material layer 62 may be a graphite or other material now known or future-developed and familiar to those skilled in the battery art.

Preferably, the flexible substrate defining the cathode 52 is a thin, flexible copper substrate and the flexible substrate defining the anode 64 is a thin, flexible aluminum substrate.

An end portion, generally designated 74, of the cathode substrate 52 extends beyond the retaining wall 72 and is oppositely disposed with an end portion, generally designated 76, of the anode substrate 64, which likewise extends beyond the end wall 72. The overlapping end portions 74, 76 define a marginal peripheral seam, generally designated as 78, and which marginal peripheral seam 78 extends completely around the peripheral edge of the battery 50. In the illustrated embodiment shown in FIG. 2, the marginal peripheral seam 78 is filled with a water-resistant composite material 80 which functions to hold the cathode substrate 52 to the anode substrate 64 and to hermetically seal the marginal peripheral seam to make the battery structure watertight. The length L of the marginal peripheral seam needs to be sufficiently long to ensure that the water-resistant composite material 80 is of sufficient thickness to prevent water seepage or impregnation and also to provide a strong bonding surface between the cathode substrate 52 and anode substrate 64 to hold the battery structure together. The length of the marginal peripheral seam is measured from the retaining wall 72 to the ends 82, 84 of the cathode substrate 52, anode substrate 64, respectively. As illustrated in FIG. 2, the water-resistant composite material 80 extends beyond the ends 82, 84 to ensure that water cannot pass between the composite-to-substrate contact surface area. The surface 54 of the cathode 52 provides a positive polarity connection lead to an external circuit. The surface 66 of the anode 64 provides a negative polarity connection lead to an external electrical circuit. The absence of an outer foil package in the battery construction of the present invention provides a more durable construction for smaller radius bending and the ability to withstand frequent bendings without damage.

Figure 3:
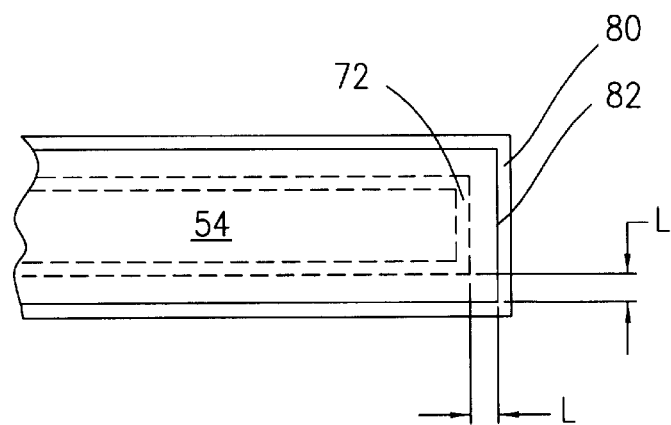
FIG. 3 is a fragmentary top plan view of the flexible battery of FIG. 2.

FIG. 3 is a fragmentary top plan view of the flexible battery structure illustrated in FIG. 2 as viewed looking down at the cathode surface 54. FIG. 3 illustrates the marginal peripheral seam having a length L into which the water-resistant composite material 80 is inserted and which extends beyond the end 82 of the substrate defining the cathode 52. Any suitable water-resistant composite material now known or future-developed that provides the desired sealing and holding property characteristics may be used.

Figure 4:
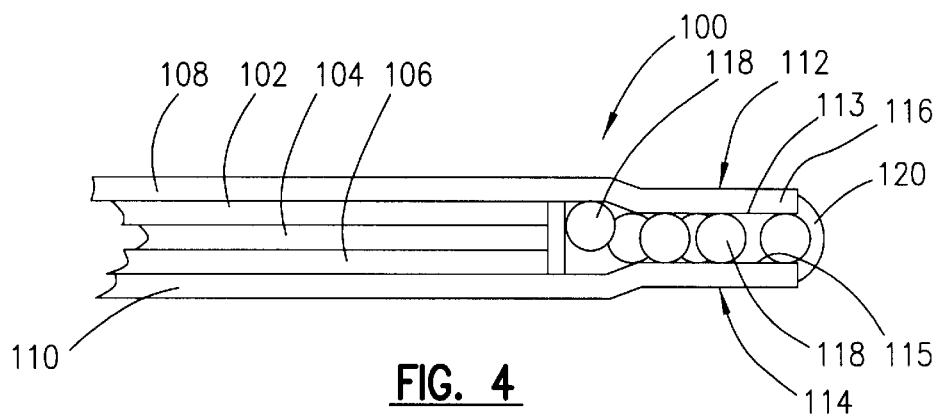
FIG. 4 is a schematic cross-section of an alternate embodiment of a flexible battery embodying the present invention.

Turning now to FIG. 4, a schematic cross-section of an alternate embodiment of a flexible battery structure embodying the present invention is illustrated therein and generally designated 100. The flexible battery 100 is similar to the flexible battery 50 illustrated in FIG. 2 and includes a layer of cathode active material 102, an electrolyte or separator layer 104, anode active material layer 106, sandwiched between the cathode 108 and anode 110. The end portion 112 of the cathode and the end portion 114 of the anode are held in an oppositely disposed relationship to one another to define the marginal peripheral seam 116. In the illustrated embodiment in FIG. 4, a plurality of glass balls or fiber balls 118 are inserted in the marginal peripheral seam 116 between the overlapping end portions 112, 114 of the cathode substrate 108 and of the anode substrate 110 respectively to create a hermetically sealed seam. The presence of the glass balls 118 allow the end portions 112, 114 to be squeezed together under pressure which forces the inner surfaces 113, 115 of the end portions 112, 114, respectively, against the surface of the glass balls to make the seam waterproof while preventing an electrical short circuit between the cathode 108 and anode 110. The glass or fiber balls 118 do not absorb moisture and thus do not allow water to enter the battery. Optionally, a water-resistant composite material or thin layer of silicon 120 may be used to fill the interstitial voids between the glass balls.

Figure 5:
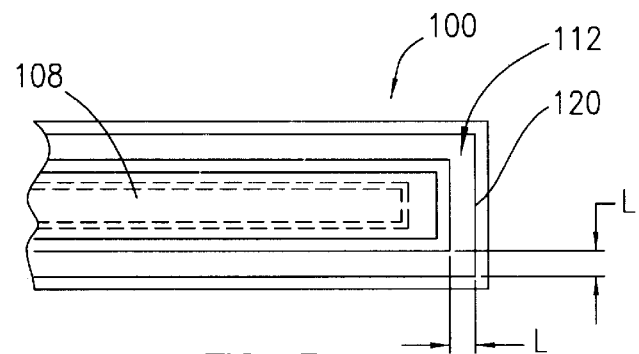
FIG. 5 is a fragmentary top plan view of the flexible battery of FIG. 4.

FIG. 5 is a fragmentary top plan view of the flexible battery structure illustrated in FIG. 4 as viewed from the cathode side 108. The marginal peripheral seam having a length L surrounds the periphery of the battery structure 100.

Figure 6:
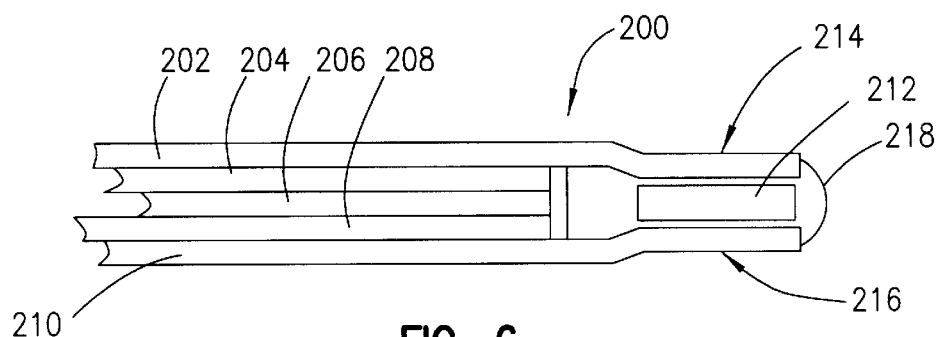
FIG. 6 is a schematic cross-section of another alternate embodiment of a flexible battery embodying the present invention.

Referring now to FIG. 6, a schematic cross-section of another alternate embodiment of the flexible battery structure embodying the present invention is illustrated therein and is generally designated 200. The battery structure 200 includes a cathode 202, cathode active material layer 204, electrolyte or separating layer 206, anode active material layer 208 and an anode 210. The construction of the battery structure of FIG. 6 is similar to that shown in FIG. 4, with the exception that a caliber 212 made of a water-resistant material is inserted between the overlapping end portions 214 of the cathode substrate 202 and the end portion 216 of the anode substrate 210 defining the marginal peripheral seam. A water-resistant composite material 218 may also be inserted into the marginal peripheral seam along with the caliber 212 and the end portions 214, 216 are squeezed under pressure during manufacture to ensure that the water-resistant composite material 218 completely fills the space between the end portions to provide the necessary waterproof seal.

Figure 7:
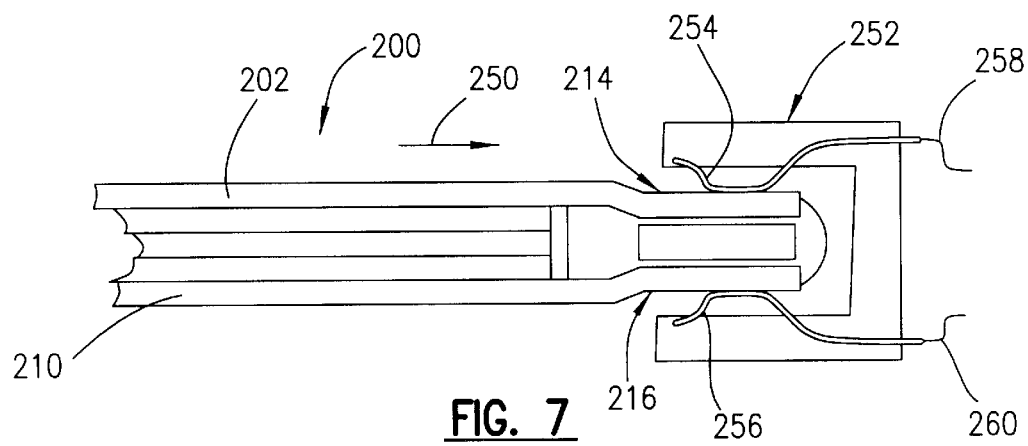
FIG. 7 is a schematic cross-section of the flexible battery of FIG. 6 showing one possible connection arrangement with an external electrical circuit.

Turning now to FIG. 7, a schematic cross-section of the flexible battery illustrated in FIG. 6 is shown in one possible connection arrangement with an external electrical circuit. The battery 200 is inserted in the direction indicated by the direction arrow 250 into an electrical connector, generally designated 252. The connector has a spring contact 254, which comes into electrical and mechanical contact with the cathode 202 end portion 214 when the battery 200 is inserted into the socket 252. A second spring contact 256 is mounted and carried by the socket 252 and comes into contact with the surface of the end portion 216 of the anode 210 when the battery structure 200 is inserted into the socket. Electrical conductors 258, 260 are connected to the spring contacts 254, 256, respectively, and lead to the external electrical circuit with which the battery structure 200 operates.

It is to be understood that the present invention is not to be considered as limited to the specific embodiments described above and shown in the accompanying drawings, which merely illustrate the best mode presently contemplated for carrying out the invention, and which is susceptible to such changes as may be obvious to one skilled in the art, but rather that the invention is intended to cover all such variations, modifications and equivalents thereof as may be deemed to be within the scope of the claims appended hereto.

What is claimed is:

1. A flexible battery structure comprising:
    a first flexible substrate having an inner surface face and an outer surface face defining a cathode;
    a layer of cathode active material adjacent to said inner surface face of said cathode substrate;
    a layer of electrolyte adjacent to said layer of cathode active material;
    a layer of anode active material adjacent to said electrolyte layer;
    a second flexible substrate having an inner surface face and an outer surface face defining an anode, said anode inner surface being adjacent to said anode active material layer;
    said first and second flexible substrates having surfaces to provide a positive polarity and negative polarity connection, respectively;
    said layers of cathode active material, electrolyte and anode active material defining a stack;
    first means for sealing said stack of layers formed between said first and second flexible substrates; and
    second means for hermetically sealing said first and second flexible substrates to prevent moisture from contacting said stack of layers.

2. A flexible battery structure as defined in claim 1, further comprising said cathode substrate and said anode substrate having surface face areas larger than said cathode active material, electrolyte and anode active material layers to define a marginal peripheral seam to sandwich said cathode material, electrolyte and anode material layers.

3. A flexible battery structure as defined in claim 2, wherein said second means for hermetically sealing further comprises one or more glass balls inserted between the region of said cathode flexible substrate and said anode flexible substrate defining said marginal peripheral seam.

4. A flexible battery structure as defined in claim 2, wherein said second means for hermetically sealing further comprises a non-electrically conductive, water-resistant composite material inserted between the region of said cathode flexible substrate and said anode flexible substrate defining said marginal peripheral seam.

5. A flexible battery structure as defined in claim 2, wherein said marginal peripheral seam is hermetically sealed.

6. A flexible battery structure as defined in claim 2, wherein said marginal peripheral seam comprises a portion of each of said cathode flexible substrate and said anode flexible substrate oppositely disposed and overlapping with respect to one another and in a spaced relationship to prevent an electrical short circuit between said cathode flexible substrate and said anode flexible substrate.

7. A flexible battery structure as defined in claim 6, wherein a water-resistant composite material is inserted between the overlapping portions of said cathode flexible substrate and said anode flexible substrate.

8. A flexible battery structure as defined in claim 1, wherein said cathode flexible substrate and said anode flexible substrate are made of metal foil.

9. A flexible battery structure as defined in claim 8, wherein said cathode flexible substrate is copper.

10. A flexible battery structure as defined in claim 8, wherein said anode flexible substrate is aluminum.

11. A flexible battery structure as defined in claim 1, further comprising said cathode outer surface face and said anode outer surface face defining the exterior surfaces of the flexible battery structure.

12. A flexible battery structure as defined in claim 11, wherein said cathode outer surface face and said anode outer surface face comprise positive polarity and negative polarity connection leads respectively.

13. A flexible battery structure as defined in claim 1, wherein said layer of electrolyte further comprises means for separating said cathode active material layer and said anode active material layer.

14. A flexible battery structure comprising:
    a first flexible substrate defining a cathode;
    a second flexible substrate having peripheral surface dimensions substantially equal to said first flexible substrate and defining an anode;
    a layer of cathode active material;
    a layer of electrolyte material;
    a layer of anode active material; said layers of cathode active material, electrolyte material and anode active material defining a stack sandwiched between said first and second flexible substrates and having peripheral dimensions smaller than said first and second flexible substrates;
    said first and second flexible substrates having surfaces to provide a positive polarity and negative polarity connection, respectively;
    a marginal peripheral seam defined by overlapping the area created by the difference in the peripheral dimensions of said first and second flexible substrates and the peripheral dimension of said stack of layers; and
    means for hermetically sealing said marginal peripheral seam.

15. A flexible battery structure as defined in claim 14, wherein said sealing means further comprises a plurality of glass balls inserted in said marginal peripheral seam defined between said first and second flexible substrates.

16. A flexible battery structure as defined in claim 15, further comprising said plurality of glass balls being pressed between said first and second flexible substrates.

17. A flexible battery structure as defined in claim 14, wherein said sealing means further comprises a water-resistant composite material inserted in said marginal peripheral seam defined between said first and second flexible substrates.

18. A flexible battery structure comprising:
   a thin, flexible copper substrate defining a cathode;
   a thin, flexible aluminum substrate defining an anode and having peripheral surface dimensions and shape substantially equal to said copper substrate;
   said flexible copper substrate and said flexible aluminum substrate respectively, defining a polarity connection lead;
   a layer of cathode active material adjacent to said cathode;
   a layer of anode active material adjacent to said anode;
   a layer of electrolyte material separating said layers of cathode and anode active materials;
   a stack of layers defined by said cathode active material, anode active material and electrolyte material layers, said stack of layers having a peripheral surface dimension and shape smaller than said copper and aluminum substrates and sandwiched therebetween, whereby a marginal peripheral seam is formed between the copper and aluminum substrate in the area defined by the difference between the peripheral surface dimensions of the copper and aluminum substrates and said stack of layers; and
   a water-resistant material inserted in said marginal peripheral seam to hermetically seal said battery structure.

19. A flexible battery structure as defined in claim 18, wherein said water-resistant material is a plurality of glass balls held in pressing engagement between said copper and aluminum substrates.

20. A flexible battery structure as defined in claim 19, further comprising a thin layer of silicon between said copper and aluminum substrates.

21. A flexible battery structure as defined in claim 18, wherein said water-resistant material is a composite water-resistant material.

* * * * *